(12) United States Patent
Jackson et al.

(10) Patent No.: US 8,603,234 B2
(45) Date of Patent: Dec. 10, 2013

(54) MAGENTA INKJET INK, AND PROCESS OF MAKING AND USING SAME

(75) Inventors: Christian Jackson, Wilmington, DE (US); Kevin J. Best, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 297 days.

(21) Appl. No.: 12/989,093

(22) PCT Filed: Jun. 25, 2009

(86) PCT No.: PCT/US2009/048664
§ 371 (c)(1),
(2), (4) Date: Oct. 22, 2010

(87) PCT Pub. No.: WO2009/158501
PCT Pub. Date: Dec. 30, 2009

(65) Prior Publication Data
US 2011/0030580 A1    Feb. 10, 2011

Related U.S. Application Data

(60) Provisional application No. 61/133,276, filed on Jun. 26, 2008.

(51) Int. Cl.
C09D 11/02    (2006.01)
(52) U.S. Cl.
USPC .................................................. 106/31.6
(58) Field of Classification Search
USPC .................................................. 106/31.6
See application file for complete search history.

(56) References Cited

U.S. PATENT DOCUMENTS

| | | | |
|---|---|---|---|
| 4,597,794 A | 7/1986 | Ohta et al. | |
| 5,006,598 A * | 4/1991 | Adams et al. | 106/31.6 |
| 5,022,592 A | 6/1991 | Zakheim et al. | |
| 5,026,427 A | 6/1991 | Mitchell et al. | |
| 5,085,698 A | 2/1992 | Ma et al. | |
| 5,310,778 A | 5/1994 | Shor et al. | |
| 5,328,504 A | 7/1994 | Ohnishi | |
| 5,519,085 A | 5/1996 | Ma et al. | |
| 5,554,739 A | 9/1996 | Belmont | |
| 5,679,138 A | 10/1997 | Bishop et al. | |
| 5,738,716 A | 4/1998 | Santilli et al. | |
| 5,891,231 A | 4/1999 | Gnerlich et al. | |
| 5,976,232 A | 11/1999 | Gore | |
| 6,030,441 A * | 2/2000 | Kubota et al. | 106/31.75 |
| 6,143,807 A | 11/2000 | Lin et al. | |
| 6,153,000 A | 11/2000 | Erdtmann et al. | |
| 6,332,943 B1 | 12/2001 | Hermann et al. | |
| 6,395,079 B1 | 5/2002 | Sano | |
| 6,533,408 B1 * | 3/2003 | Erdtmann et al. | 106/31.6 |
| 6,843,840 B2 * | 1/2005 | Kataoka et al. | 106/31.6 |
| 6,852,156 B2 | 2/2005 | Yeh et al. | |
| 6,880,923 B2 | 4/2005 | Jung et al. | |
| 6,958,090 B2 * | 10/2005 | Redfearn et al. | 106/31.6 |
| 7,008,475 B2 * | 3/2006 | Randler et al. | 106/31.6 |
| 7,399,351 B2 * | 7/2008 | Jackson et al. | 106/31.6 |
| 2003/0089277 A1 | 5/2003 | Zakheim et al. | |
| 2003/0167965 A1 | 9/2003 | Lin | |
| 2005/0090599 A1 | 4/2005 | Spinelli | |
| 2006/0268084 A1 * | 11/2006 | Nishizaki et al. | 347/100 |
| 2007/0103525 A1 * | 5/2007 | Yamamoto et al. | 347/100 |
| 2007/0186804 A1 * | 8/2007 | Heckmann et al. | 106/31.6 |
| 2008/0071007 A1 | 3/2008 | Spinelli | |

FOREIGN PATENT DOCUMENTS

| | | | |
|---|---|---|---|
| EP | 1676893 | | 10/2004 |
| JP | 2005/041970 | * | 2/2005 |

OTHER PUBLICATIONS

Machine translation of JP 2005/041970, Feb. 2005.*
Machine translation of JP 2001/002962, Jan. 2001.*
Machine translation of JP 2000/181144, Jun. 2000.*
International Search Report dated Sep. 16, 2009.
Particle Size Measurement, Chapter 14, 3rd Edition, Terence Allen, Chapman & Hill, 1981.

* cited by examiner

*Primary Examiner* — Helene Klemanski
(74) *Attorney, Agent, or Firm* — Simon L. Xu

(57) ABSTRACT

The present invention pertains to a magenta inkjet ink comprising a combination of pigments which provide favorable hue, chroma and optical density. The invention also pertains to a process of making the magenta ink and an inkjet ink set comprising this magenta ink.

10 Claims, No Drawings

MAGENTA INKJET INK, AND PROCESS OF MAKING AND USING SAME

CROSS REFERENCE TO RELATED APPLICATIONS

This application claims the benefit of U.S. Provisional Application Ser. No. 61/133,276 filed on Jun. 26, 2008, and U.S. Provisional Application Ser. No. 61/155,999 filed on Feb. 27, 2009.

BACKGROUND OF THE INVENTION

This invention pertains to a magenta inkjet ink comprising a combination of certain pigment colorants. The invention also pertains to a process of making the magenta inkjet ink and an inkjet ink set comprising this magenta ink.

Inkjet printing is a non-impact printing process in which droplets of ink are deposited on a substrate, such as paper, to form the desired image. Inkjet printers are equipped with an ink set which, for full color printing, typically comprises a cyan, magenta and yellow ink (CMY). An ink set also commonly comprises a black ink (CMYK). Colorants for the inks can be soluble in the ink vehicle (dyes) or insoluble (pigments).

Pigment Red 122 (PR122) is the most often used magenta pigment colorant. Pigmented inkjet ink sets comprising Pigment Red 122 as the magenta colorant are disclosed, for example, in U.S. Pat. Nos. 5,085,698; 5,738,716; 6,153,000 and 6,395,079. An improved magenta pigment colorant should compare favorably with PR122 in terms of optical density and chroma.

Magenta inkjet inks comprising Pigment Red 146 as the magenta colorant are disclosed, for example, in U.S. Pat. Nos. 5,328,504; 6,680,355 and 6,332,943.

Magenta inkjet inks comprising Pigment Red 184 as the magenta colorant is disclosed, for example, in U.S. Patent Application Publication No. 2003/0167965.

While various known magenta inkjet ink colorants, both pigment and dye, provide printed images having good color characteristics, a need still exists for alternative colorants with higher optical density, chroma and/or lower cost. The present invention satisfies this need by providing compositions having improved optical density, chroma, hue and cost.

SUMMARY OF THE INVENTION

An embodiment of the invention provides a magenta inkjet ink comprising a vehicle and a pigment colorant dispersed in the vehicle, wherein the pigment colorant comprises a first pigment selected from the group consisting of Pigment Red 146 (PR146), Pigment Red 184 (PR184), Pigment Red 269 (PR269) and combinations thereof, and a second pigment selected from the group consisting of Pigment Red 122 (PR122), Pigment Violet 23 (PV23) and combinations thereof.

Another embodiment provides that the magenta inkjet ink comprises Pigment Red 146 and Pigment Red 122, wherein the weight ratio of Pigment Red 146 to Pigment Red 122 is in the range of about 2:3 to about 5:1.

Another embodiment provides that the magenta inkjet ink comprises Pigment Red 146 and Pigment Violet 23, wherein the weight ratio of Pigment Red 146 to Pigment Violet 23 is in the range of about 4:1 to about 25:1.

Another embodiment provides that the magenta inkjet ink comprises Pigment Red 184 and Pigment Red 122, wherein the weight ratio of Pigment Red 184 to Pigment Red 122 is in the range of about 2:3 to about 5:1.

Another embodiment provides that the magenta inkjet ink comprises Pigment Red 184 and Pigment Violet 23, wherein the weight ratio of Pigment Red 184 to Pigment Violet 23 is in the range of about 4:1 to about 25:1.

Another embodiment provides that the magenta inkjet ink comprises Pigment Red 269 and Pigment Red 122, wherein the weight ratio of Pigment Red 269 to Pigment Red 122 is in the range of about 2:3 to about 5:1.

Another embodiment provides that the vehicle is an aqueous vehicle.

Another embodiment provides that the magenta inkjet ink has a surface tension in the range of about 20 mN·m$^{-1}$ to about 50 mN·m$^{-1}$ at 25° C., and a viscosity in the range of about 1 mPa·s to about 20 mPa·s at 25° C.

Another embodiment provides an inkjet ink set comprising:
(a) a magenta ink comprising a magenta inkjet ink as described above;
(b) a cyan ink comprising an aqueous vehicle and a cyan pigment colorant dispersed in the aqueous vehicle, wherein the cyan pigment colorant comprises one or more members selected from the group consisting of Pigment Blue 15:3 (PB15:3), Pigment Blue 15:4 (PB15:4) and combinations thereof; and
(c) a yellow ink comprising an aqueous vehicle and a yellow pigment colorant dispersed in the aqueous vehicle, wherein the yellow pigment colorant comprises Pigment Yellow 74 (PY74).

Another embodiment provides that the cyan pigment colorant in the ink set is Pigment Blue 15:13.

Another embodiment provides that the cyan pigment colorant in the ink set is Pigment Blue 15:14.

Another embodiment provides a process for the production of a magenta inkjet ink comprising the steps of:
(a) combining a first pigment with a second pigment, wherein said first pigment is a member selected from the group consisting of Pigment Red 146, Pigment Red 184, Pigment Red 269 and combinations thereof, and said second pigment is a member selected from the group consisting of Pigment Red 122, Pigment Violet 23 and combinations thereof;
(b) combining a dispersant; and
(c) milling to obtain a dispersion.

Another embodiment provides that the first pigment is Pigment Red 146 and the second pigment is Pigment Red 122, and wherein the weight ratio of Pigment Red 146 to Pigment Red 122 is in the range of about 2:3 to about 5:1.

Yet another embodiment provides that the first pigment is Pigment Red 146 and the second pigment is Pigment Violet 23, and wherein the weight ratio of Pigment Red 146 to Pigment Violet 23 is in the range of about 4:1 to about 25:1.

The pigment names and abbreviations used herein are the "C.I." designation for pigments established by Society of Dyers and Colourists, Bradford, Yorkshire, UK and published in *The Color Index*, Third Edition, 1971.

These and other features and advantages of the present invention will be more readily understood by those of ordinary skill in the art from a reading of the following Detailed Description. Certain features of the invention which are, for clarity, described above and below as a separate embodiment, may also be provided in combination in a single embodiment. Conversely, various features of the invention that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this invention pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, reference to enhanced or improved "print quality" means some aspect of optical density, gloss, and Distinctness of Image (DOI) of the printed images and fastness (resistance to ink removal from the printed image) is increased, including, for example, rub fastness (finger rub), water fastness (water drop) and smear fastness (highlighter pen stroke).

As used herein, the term "SDP" means a "self-dispersible" or "self-dispersing" pigment.

As used herein, the term "dispersion" means a two phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments other than self-dispersing pigments, the dispersants are most often polymeric dispersants, and the dispersants and pigments are usually combined using dispersing equipment.

As used herein, the term "OD" means optical density.

As used herein, the term "Gloss" means observation of reflected light from a printed surface, normally the printed substrate is glossy paper.

As used herein, the term "aqueous vehicle" refers to water or a mixture of water and at least one water-soluble organic solvent (co-solvent).

As used herein, the term "ionizable groups" means molecular moieties that have the potential to become ionic under certain conditions.

As used herein, the term "jetability" means good jetting properties with no clogging or deflection during printing.

As used herein, the term "Mn" means number average molecular weight.

As used herein, the term "psi" means pound per square inch, a pressure unit.

As used herein, the term "cP" means centipoise, a viscosity unit.

As used herein, the term "mPa·s" means millipascal second, a viscosity unit.

As used herein, the term "mN·m$^{-1}$" means milliNewtons per meter, a surface tension unit.

As used herein, the term "mS/cm" means milliSiemens per centimeter, a conductivity unit.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "NTA" means nitrilotriacetic acid.

As used herein, the term "DHEG" means dihydroxyethylglycine.

As used herein, the term "CyDTA" means trans-1,2-cyclohexanediaminetetraacetic acid.

As used herein, the term "DTPA" means dethylenetriamine-N,N,N',N'',N''-pentaacetic acid.

As used herein, the term "GEDTA" means glycoletherdiamine-N,N,N',N'-tetraacetic acid.

As used herein, Surfynol® 465 is a surfactant commercially available from Air Products (Allentown, Pa., U.S.A.).

As used herein, Glycereth-26 is the polyethylene glycol ether of Glycerin with an average ethoxylation value of 26.

As used herein, Proxel™ GXL is a Biocide commercially available from Avecia (Wilmington, Del., U.S.A.).

Unless otherwise noted, the above chemicals were obtained from Aldrich (Milwaukee, Wis., U.S.A.) or other similar suppliers of laboratory chemicals.

The materials, methods, and examples herein are illustrative only except as explicitly stated, and are not intended to be limiting.

In addition, references in the singular may also include the plural (for example, "a" and "an" may refer to one, or one or more) unless the context specifically states otherwise.

Pigment

Raw pigment is insoluble and non-dispersible in the ink vehicle and must be treated in order to form a stable dispersion. "A stable dispersion" means that the pigment is finely divided, uniformly distributed and resistant to particle growth and flocculation.

Treatment of a pigment with a dispersant can stabilize the pigment by forming a dispersion. The term "dispersant" as used herein is generally synonymous with the terms "dispersing agent" and "suspending agent" which are also found in the art.

The dispersant can be any suitable dispersant such as, for example, those disclosed in U.S. Pat. Nos. 4,597,794; 5,085,698; 5,519,085 and 6,143,807, and U.S. Patent Publication. No. US2008/0071007.

Dispersions are prepared by premixing pigment and dispersant, followed by dispersing or deflocculating the mixture in a milling step. The premixture includes an aqueous carrier medium (such as water and, optionally, a water-miscible solvent) when the milling step involves a wet milling operation. The milling step may be accomplished in a 2-roll mill, media mill, a horizontal mini mill, a ball mill, an attritor, or by passing an aqueous premix through a plurality of nozzles within a liquid jet interaction chamber at a liquid pressure of at least 5,000 psi to produce a uniform dispersion of the pigment particles in the aqueous carrier medium (microfluidizer). Alternatively, the concentrates may be prepared by dry milling the dispersant and the pigment under pressure. The media for the media mill is chosen from commonly available media, including zirconia, YTZ® (Nikkato Corporation, Osaka, Japan), and nylon. These various dispersion processes are in a general sense well-known in the art, as exemplified by U.S. Pat. Nos. 5,022,592; 5,026,427; 5,310,778; 5,891,231; 5,679,138 and 5,976,232, and U.S. Patent Publication. No. 2003/0089277. The pigment dispersion is typically made in a concentrated form (dispersion concentrate), which is subsequently diluted with a suitable liquid containing the desired additives to form the final ink.

It may also be possible to make one or more of the pigments into a so-called self-dispersing pigment. The term self-dispersing pigment ("SDP") refers to pigment particles whose surface has been chemically modified with hydrophilic dispersibility-imparting groups that allow stable dispersion in an aqueous vehicle without a separate dispersant. The hydrophilic dispersibility-imparting surface groups are typically ionizable.

An SDP may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. No. 5,554,739 and U.S. Pat. No. 6,852,156.

Each of the prescribed non-self-dispersing pigments may be individual dispersed and then blended together to form the final mixture. The final mixture can also be prepared by a process comprising the steps of: (a) combining a first pigment with a second pigment wherein said first pigment and second pigment are as set forth above; (b) combining a dispersant; and (c) milling to obtain a dispersion.

During step (a), raw pigments are combined in a mill. During step (b), a dispersant and optionally a suitable solvent are added to the mill. During step (c), milling should continue until a dispersion with a desired particle size is obtained. The median particle size of the dispersion should be less than 200 nm. Typically the median article size is less than 150 nm. More typically the median article size is less than 125 nm.

The milling or dispersing process in steps (a), (b) and (c) is understood to mean taking raw pigments with a dispersant and processing it according to the steps described above to obtain a dispersed pigment which can be used as is or further dispersed into an aqueous media.

The particle size values of the dispersion are based on values measured by laser diffraction methods compliant with ISO 13320-1 Particle size analysis—laser diffraction methods (International Organization for Standardization). Commercial equipment for such measurement includes a Microtrac Particle Size Analyzer manufactured by Microtrac Inc., Montgomeryville, Pa., USA. A description of laser diffraction methodology can be found, for example, in *Particle Size Measurement* Chapter 14, 3rd edition, Terence Allen, Chapman and Hall, 1981.

Colorant species other than the prescribed pigments may be present in the ink, or the ink colorant may consist essentially of only the prescribed pigments.

The amount of colorant present in the ink is typically in the range of about 0.1% to about 10% by weight, and more typically in the range of about 0.5% to about 8% by weight, based on the total weight of ink.

For the inks of the present invention, the colorants and the relative ratios of colorants are generally selected to achieve a magenta color having a hue angle (see Color Measurement section below) in the range of about 330 to about 10. However, one needs to bear in mind that the measured hue of a printed sample can vary depending on substrates used. A full strength ink printed at 100% coverage on paper, such as plain or photoglossy paper, will generally have a chroma (see Color Measurement section below) greater than 40 and typically greater than 50.

Vehicle

The ink vehicle is the liquid carrier (or medium) for the colorant and can be aqueous or non-aqueous. In a preferred embodiment, the vehicle is an aqueous vehicle.

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present invention are those that are disclosed in U.S. Pat. No. 5,085,698.

If a mixture of water and a water-soluble solvent is used, the aqueous vehicle typically will contain about 30% to about 95% of water with the remaining balance (i.e., about 70% to about 5%) being the water-soluble solvent. Compositions of the present invention may contain about 60% to about 95% of water, based on the total weight of the aqueous vehicle.

The amount of aqueous vehicle in the ink is typically in the range of about 70 to about 99.8%; specifically about 80% to about 99.8%, based on total weight of the ink.

The aqueous vehicle can be made to be fast penetrating (rapid drying) by including surfactants or penetrating agents such as glycol ether(s) or 1,2-alkanediols. Suitable surfactants include ethoxylated acetylene diols (e.g., Surfynols® series commercially available from Air Products), ethoxylated primary (e.g., Neodol® series commercially available from Shell) and secondary (e.g., Tergitol® series commercially available from Union Carbide) alcohols, sulfosuccinates (e.g., Aerosol® series commercially available from Cytec), organosilicones (e.g., Silwet® series commercially available from Witco) and fluoro surfactants (e.g., Zonyl® series commercially available from DuPont).

The amount of glycol ether(s) or 1,2-alkanediol(s) added must be properly determined, but is typically in a range of from about 1% to about 15% by weight, and more typically about 2% to about 10% by weight, based on the total weight of the ink. Surfactants may be used, typically in an amount of about 0.01% to about 5%, and specifically from about 0.2% to about 2%, based on the total weight of the ink.

Additives

Other ingredients and additives, may be formulated into the inkjet ink, to the extent that such other ingredients or additives do not interfere with the stability and jetability of the inkjet ink. This may be readily determined by routine experimentation by one skilled in the art.

Surfactants are commonly added to inks to adjust surface tension and wetting properties. Suitable surfactants include those disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N''',N'''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They can also be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Preferred classes of polymer additives include anionic acrylic, styrene-acrylic and polyurethane polymer.

When a soluble polymer is present, its level is typically between about 0.01% and about 3% by weight, based on the total weight of an ink. The upper limit is dictated by ink viscosity or other physical limitations.

Biocides may be added to inhibit growth of microorganisms. Buffers may be added to maintain pH.

Proportions of Ingredients

The components described above can be combined to make an ink in various proportions and combinations in order to achieve the desired ink properties. Some experimentation may be necessary to optimize an ink for a particular end use, but such optimization is within the ability of one of ordinary skill in the art.

The amount of vehicle in an ink is typically in the range of from about 70% to about 99.8%, and more typically from about 80% to about 99%. The levels of colorant employed in formulated inks are those levels needed to impart the desired optical density to the printed image. As noted previously, the amount of colorant is typically in the range of 0.1% to about 10% by weight, and more typically in the range of about 0.5% to about 8% by weight, based on the total weight of the ink.

Additives, when present, generally comprise less than about 15% by weight, based on the total weight of the ink. Surfactants, when added, are generally in the range of about 0.1% to about 3% by weight based on the total weight of the ink. Polymers can be added as needed, but will generally be less than about 12% by weight based on the total weight of the ink.

Ink Properties

Drop velocity, separation length of the droplets, drop size and stream stability are greatly affected by the surface tension and the viscosity of the ink. Ink jet inks typically have a surface tension in the range of about 20 mN·m$^{-1}$ to about 50 mN·m$^{-1}$ at 25° C. Viscosity can be as high as 30 mPa·s at 25° C., but is typically in the range of about 1 mPa·s to about 20 mPa·s at 25° C. The ink has physical properties that are compatible with a wide range of ejecting conditions and printhead design. The inks should have excellent storage stability for long periods so as not to clog to a significant extent in an inkjet apparatus. Furthermore, the ink should not corrode parts of the ink jet printing device it comes in contact with, and it should be essentially odorless and non-toxic. Preferred pH for the ink is in the range of from about 6 to about 8.

Ink Set

The term "ink set" refers to all the individual inks or other fluids an inkjet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. Thus, an ink set comprising the required magenta pigmented ink of the present invention will also commonly comprise a cyan and yellow ink or a cyan, yellow and black ink.

In addition to the typical CMY or CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. Such other inks are, in a general sense, known to one skilled in the art.

The other inks in the ink set are also typically aqueous inks and are subject to the same formulation considerations as those herein before described for the presently claimed magenta ink. The other inks in the ink set may be pigment based or dye based. Typically the other inks are pigment based. Examples of pigments with coloristic properties useful in inkjet inks, in addition to those already mentioned, include: magenta pigments from Pigment Red 122 and Pigment Red 202; yellow pigments from Pigment Yellow 14, Pigment Yellow 95, Pigment Yellow 110, Pigment Yellow 114, Pigment Yellow 128 and Pigment Yellow 155; red pigments from Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; green pigments from Pigment Green 1, Pigment Green 2, Pigment Green 7 and Pigment Green 36; blue pigments from Pigment Blue 60, Pigment Violet 3, Pigment Violet 19, Pigment Violet 23, Pigment Violet 32, Pigment Violet 36 and Pigment Violet 38; and black pigment carbon black.

The ink set may also include a fixer ink. A fixer is an ink that is jetted over and/or under a colored ink to enhance the coloristic or durability properties. Generally, a fixer for pigments is designed to increase chroma and/or optical density. Fixer inks are usually colorless and comprise an aqueous vehicle and one or more fixing agent(s).

Substrate

The substrate can be any suitable substrate, but the instant invention is particularly useful for printing on paper, especially "plain" paper and specialty paper such as photo glossy paper.

The following examples illustrate the invention without, however, being limited thereto.

EXAMPLES

Polymer 1

Polymer 1 is a random copolymer of benzylmethacrylate (BzMA) and methacrylic acid (MAA) with a weight ratio of 90/10 BzMA/MAA. The number average molecular weight (Mn) is about 5,000 g/mol. Polymer 1 was prepared according to the disclosure in U.S. Patent Publication. No. 2005/0090599 and recovered as a concentrated solution in 2-pyrrolidone solvent.

Dispersions

The aqueous dispersions listed in Table A below were prepared using Polymer 1 as the dispersant. The pigment to dispersant weight ratio is 2.5:1. Ingredients were first mixed in a High Speed Disperser (HSD), and then milled in a media mill using YTZ® media. Each milled dispersion was purified by an ultra filtration to remove any solvent introduced with the dispersant and provide a final dispersion in water with 12% of pigment. Proxel™ GXL, in a quantity of about 0.2% by weight of the total dispersion, was added to inhibit microbial growth. Also listed in Table A are trade names for the corresponding Color Index names for each of the pigment used.

TABLE A

| Dispersion | Pigment Color Index Name | Pigment Trade Name | Vendor/Mfg |
|---|---|---|---|
| A | PR122 | Magenta E-02 | Clariant* |
| B | PR146 | Permanent Carmine FBB02 | Clariant* |
| C | PV23 | VC-6100 | Pyosa^ |
| D | PB15:3 | Cyan TRB-2 | Dainichiseika¥ |
| E | PY74 | Yellow 5GX-03 | Clariant* |
| F | PR184 | Permanent Rubine | Clariant* |
| G | PR269 | Naphthol Red 269 | European Colour§ |

*commercially available from Clariant Pigments and Additives, Coventry, RI, USA.
^commercially available from PYOSA S.A. de C.V., Monterrey, Nuevo León, Mexico.
¥commercially available from Dainichiseika Color & Chemicals Mfg. Co., Ltd. Chuoku, Tokyo 103-8383, Japan.
§commercially available from European Color Pigments, Fall River MA, USA.

Color Measurement

The coverage that an inkjet printer puts down on a substrate is usually controlled by the printer software and can be set in the printer settings. Printing was done in the selected standard print mode that targets 100% coverage. This setting for 100% coverage means that the inkjet printer is to fire enough droplets/dots to cover at least 100% of the area being printed. This usually results in dots spreading and partially overlapping with each other. The reported optical density (OD) values are the ones for areas printed at 100% coverage.

Optical density, chroma, hue and gamut volume were measured using a Greytag-Macbeth Spectrolino spectrometer. The hue ($h_{ab}$) and chroma ($C^*_{ab}$) values are based on CIELAB colorspace L*, a* and b* terms according to the following equation:

$$h_{ab} = \tan^{-1}(b^*/a^*)$$

wherein the angle is adjusted for the appropriate quadrant and $C^*_{ab} = (a^{*2} + b^{*2})^{1/2}$. The measurements and definitions are well known in the art, see: for example, *ASTM Standard E308*, published by American Society for Testing and Materials (ASTM) International, and *Principles of Color Technology*, Billmeyer and Saltzman, 3rd Ed., Roy Berns editor, John Wiley & Sons, Inc. (2000).

Example 1

Inks 1A-1B, 2A-2B, and 3A-3B were prepared using Dispersions A-C and other ingredients according to Table 1A. Ink 1A is a comparative ink with colorant PR122 only. Ink 1B is a comparative ink with colorant PR146 only. Ink 2A-2B are inventive inks of the present invention prepared with PR122 and PR146. Inks 3A-3B are inventive inks of the present invention prepared with PR146 and PV23.

TABLE 1A

| Ingredients | Ink 1A (Comparative) | Ink 1B (Comparative) | Ink 2A | Ink 2B | Ink 3A | Ink 3B |
|---|---|---|---|---|---|---|
| Dispersion A* | 3.0 | — | 1.5 | 2.0 | — | — |
| Dispersion B* | — | 3.0 | 1.5 | 2.0 | 2.7 | 3.6 |
| Dispersion C* | — | — | — | — | 0.3 | 0.4 |
| 2-Pyrrolidone* | 8.0 | 8.0 | 8.0 | 8.0 | 8.0 | 8.0 |
| 1,2-hexanediol* | 0.5 | 0.5 | 0.5 | 0.5 | 0.5 | 0.5 |
| Glycerol* | 2.0 | 2.0 | 2.0 | 2.0 | 2.0 | 2.0 |
| Glycereth-26* | 6.0 | 6.0 | 6.0 | 6.0 | 6.0 | 6.0 |
| Ethylene glycol* | 2.0 | 2.0 | 2.0 | 2.0 | 2.0 | 2.0 |
| Surfynol 465* | 0.3 | 0.3 | 0.3 | 0.3 | 0.3 | 0.3 |
| Water Added | Balance to 100% | Balance to 100% | Balance to 100% | Balance to 100% | Balance to 100% | Balance to 100% |

*as % by weight based on total weight of ink

Inks were loaded into and printed from a Canon i560 printer. The substrates used include Xerox 4200 paper, Hewlett Packard Multipurpose paper ("HP Multipurpose") and Hewlett Packard Bright White paper ("HP Bright White").

Print properties of inks on the various papers are summarized in Table 1B. Ink 2A, having a combination of PR146 and PR122, was found to have favorable optical density and chroma compared to Ink 1A with PR122 as the only colorant. Also, Ink 2A was found to have a hue closer to PR122 compared to Ink 1B with PR146 as the only colorant.

Ink 3A, having a combination of PR146 and PV23, was found to have a favorable optical density compared to Ink 1A with PR122 as the only colorant, although its chroma is somewhat lower. Also, the hue of ink 3A was found to shift desirably toward that of PR122 compared to ink 1B with PR146 as the only colorant.

Inks 2B and 3B, with their higher concentration of pigment, did not appear to provide any benefit over the corresponding inks 2A and 3A with lower concentration of pigment under the conditions tested.

TABLE 1B

| Print Properties | Ink 1A | Ink 1B | Ink 2A | Ink 2B | Ink 3A | Ink 3B |
|---|---|---|---|---|---|---|
| Optical Density | | | | | | |
| Xerox 4200 | 0.94 | 1.08 | 1.06 | 1.16 | 1.10 | 1.23 |
| HP Multipurpose | 1.07 | 1.28 | 1.23 | 1.27 | 1.31 | 1.34 |
| HP Bright White | 1.05 | 1.35 | 1.20 | 1.19 | 1.28 | 1.31 |
| Chroma (Chroma Unit) | | | | | | |
| Xerox 4200 | 67 | 69 | 68 | 70 | 55 | 49 |
| HP Multipurpose | 74 | 74 | 74 | 74 | 53 | 45 |
| HP Bright White | 73 | 76 | 73 | 72 | 61 | 52 |
| Hue (degree) | | | | | | |
| Xerox 4200 | 343 | 6 | 356 | 359 | 353 | 341 |
| HP Multipurpose | 343 | 11 | 357 | 1 | 360 | 353 |
| HP Bright White | 342 | 10 | 356 | 359 | 354 | 358 |

Example 2

A cyan ink and a yellow ink were prepared using Dispersions D-E and other ingredients according Table 2A below. These two inks were then used together with magenta inks 1A, 1B, 2A or 3A in ink sets.

TABLE 2A

| Ingredients | Cyan Ink | Yellow Ink |
|---|---|---|
| Dispersion D* | 3.0 | — |
| Dispersion E* | — | 4.0 |
| 2-Pyrrolidone* | 8.0 | 8.0 |
| 1,2-hexanediol* | 0.5 | 0.5 |
| Glycerol* | 2.0 | 2.0 |
| Glycereth-26* | 6.0 | 6.0 |

TABLE 2A-continued

| Ingredients | Cyan Ink | Yellow Ink |
| --- | --- | --- |
| Ethylene glycol* | 2.0 | 2.0 |
| Surfynol 465* | 0.3 | 0.3 |
| Water Added | Balance to 100% | Balance to 100% |

*as % by weight based on total weight of ink

The gamut volume of ink sets using the cyan and yellow inks together with magenta inks 1A, 1 B, 2A or 3A are summarized in Table 2B. The gamut volume was determined using the calculation method described in U.S. Pat. No. 7,233,413. The target pattern comprised the primary and secondary colors. A standard black value of $L^*=20$, $a^*=4$ and $b^*=0$ was used for each calculation. The results showed that the ink set with inventive Ink 2A has favorable (larger) volume compared to the ink set with the comparative Ink 1A or Ink 1 B. The ink set with inventive Ink 3A also had a good gamut, but not quite as large as those for the comparative inks. The gamut volume is expressed in $L^*a^*b^*$ unit.

TABLE 2B

| Magenta Ink | Gamut Volume ($L^*a^*b^*$ unit) |
| --- | --- |
| Ink 1A (Comparative) | 358,000 |
| Ink 1B (Comparative) | 349,000 |
| Ink 2A | 363,000 |
| Ink 3A | 331,000 |

Example 3

Inks 5A-5E were prepared using colorants PR122, PV23, PR184, and other ingredients according to Table 3A. Ink 5E is a comparative ink with PR184 as the only colorant.

TABLE 3A

| Ingredients | Ink 5A | Ink 5B | Ink 5C | Ink 5D | Ink 5E (Comparative) |
| --- | --- | --- | --- | --- | --- |
| Dispersion A* | 2.0 | 2.5 | — | — | — |
| Dispersion C* | — | — | 0.3 | 0.5 | — |
| Dispersion F* | 2.0 | 2.5 | 2.7 | 3.0 | 3.0 |
| 2-Pyrrolidone* | 8.0 | 8.0 | 8.0 | 8.0 | 8.0 |
| 1,2-hexanediol* | 0.5 | 0.5 | 0.5 | 0.5 | 0.5 |
| Glycerol* | 2.0 | 2.0 | 2.0 | 2.0 | 2.0 |
| Glycereth-26* | 6.0 | 6.0 | 6.0 | 6.0 | 6.0 |
| Ethylene glycol* | 2.0 | 2.0 | 2.0 | 2.0 | 2.0 |
| Surfynol 465* | 0.3 | 0.3 | 0.3 | 0.3 | 0.3 |
| Water Added | Balance to 100% | Balance to 100% | Balance to 100% | Balance to 100% | Balance to 100% |

*as % by weight based on total weight of ink

Inks 5A-5F were printed as described in Example 1. Print properties on various papers are summarized in Table 3B. Results showed that the inventive inks had appropriate hue and favorable optical density compared to Ink 5E with PR184 as the only colorant or Ink 1A with PR122 as the only colorant. The chroma was also favorable for inks 5A and 5B, but it diminished somewhat for inks 5C and 5D.

TABLE 3B

| Print Properties | Ink 5A | Ink 5B | Ink 5C | Ink 5D | Ink 5E (Comparative) |
| --- | --- | --- | --- | --- | --- |
| Optical Density | | | | | |
| Xerox 4200 | 1.18 | 1.24 | 1.12 | 1.14 | 1.07 |
| HP Multipurpose | 1.34 | 1.41 | 1.20 | 1.29 | 1.34 |
| HP Bright White | 1.31 | 1.39 | 1.21 | 1.28 | 1.28 |
| Chroma (Chroma unit) | | | | | |
| Xerox 4200 | 68 | 67 | 52 | 47 | 64 |
| HP Multipurpose | 72 | 72 | 56 | 51 | 73 |
| HP Bright White | 72 | 72 | 56 | 51 | 72 |
| Hue (degree) | | | | | |
| Xerox 4200 | 356 | 359 | 343 | 346 | 359 |
| HP Multipurpose | 358 | 2 | 346 | 346 | 3 |
| HP Bright White | 357 | 1 | 344 | 346 | 3 |

Example 4

Inks 6A-6D were prepared using Dispersions A and G, and other ingredients according to Table 4A. Ink 6D is a comparative ink with PR269 (in Dispersion G) as the only colorant.

TABLE 4A

| Ingredients | Ink 6A | Ink 6B | Ink 6C | Ink 6D (Comparative) |
| --- | --- | --- | --- | --- |
| Dispersion A* | 1.0 | 1.5 | 2.0 | — |
| Dispersion G* | 2.0 | 1.5 | 1.0 | 3.0 |
| 2-Pyrrolidone* | 5.0 | 5.0 | 5.0 | 5.0 |
| 1,2-hexanediol* | 2.0 | 2.0 | 2.0 | 2.0 |
| Glycerol* | 5.0 | 5.0 | 5.0 | 5.0 |
| Glycereth-26* | 5.0 | 5.0 | 5.0 | 5.0 |
| Ethylene glycol* | 5.0 | 5.0 | 5.0 | 5.0 |
| Surfynol 465* | 0.5 | 0.5 | 0.5 | 0.5 |
| Water Added | Balance to 100% | Balance to 100% | Balance to 100% | Balance to 100% |

*as % by weight based on total weight of ink

Inks 6A-6D were printed as described in Example 1. Print properties on various papers are summarized in Table 4B. Results showed that the inventive inks 6A-6C had appropriate hue, good chroma and favorable optical density compared to Ink 1A with PR122 as the only colorant.

TABLE 4B

| Print Properties | Ink 6A | Ink 6B | Ink 6C | Ink 6D |
| --- | --- | --- | --- | --- |
| Optical Density | | | | |
| Xerox 4200 | 1.10 | 1.12 | 1.11 | 1.14 |
| HP Multipurpose | 1.24 | 1.28 | 1.27 | 1.34 |
| HP Bright White | 1.28 | 1.30 | 1.31 | 1.37 |
| Chroma (Chroma unit) | | | | |
| Xerox 4200 | 69 | 69 | 70 | 68 |
| HP Multipurpose | 74 | 75 | 76 | 75 |
| HP Bright White | 75 | 75 | 77 | 75 |
| Hue (degree) | | | | |
| Xerox 4200 | 354 | 352 | 350 | 358 |
| HP Multipurpose | 354 | 353 | 351 | 1 |
| HP Bright White | 353 | 352 | 350 | 360 |

Example 5

A secondary red color was printed from a Canon i560 printer using the yellow ink of Example 2 together with a magenta inventive ink (Ink 2A, Ink 5B or Ink 6C), or the comparative magenta Ink 1A. The ratio of the yellow ink to the magenta ink is 1:1. Print properties, summarized in Table 5A, showed that the secondary red from the yellow ink of Example 2 together with the magenta inventive inks (Ink 2A, Ink 5B or Ink 6C) has better OD and comparable chroma compared to the secondary red from the same yellow ink of Example 2, but together with the comparative magenta Ink 1A, when printed on HP Multipurpose and HP Bright White papers.

TABLE 5A

| Print Properties | Yellow ink + Ink 1A | Yellow ink + Ink 2A | Yellow ink + Ink 5B | Yellow ink + Ink 6C |
|---|---|---|---|---|
| Optical Density | | | | |
| Xerox 4200 | 1.10 | 1.09 | 1.07 | 1.08 |
| HP Multipurpose | 1.16 | 1.31 | 1.19 | 1.22 |
| HP Bright White | 1.12 | 1.30 | 1.19 | 1.19 |
| Chroma (Chroma unit) | | | | |
| Xerox 4200 | 63 | 67 | 63 | 59 |
| HP Multipurpose | 70 | 78 | 70 | 66 |
| HP Bright White | 67 | 79 | 70 | 66 |
| Hue (degree) | | | | |
| Xerox 4200 | 42 | 40 | 34 | 32 |
| HP Multipurpose | 42 | 41 | 36 | 34 |
| HP Bright White | 42 | 41 | 36 | 33 |

Example 6

Dispersion H

Dispersion H was prepared by premixing equal weights of PR122 and PR146 followed by using Polymer 1 as a dispersant with a pigment to dispersant weight ratio of 2.5:1. Ingredients were mixed in a High Speed Disperser (HSD) and then milled in a media mill using YTZ® media. The milled dispersion was purified by an ultra filtration to remove any solvent introduced with the dispersant and provide a final dispersion in water with 12% of pigment. Proxel™ GXL, in a quantity of about 0.2% by weight of total dispersion, was added to inhibit microbial growth. The physical properties of this dispersion when freshly made, and after aging for two weeks in an oven set at 60° C., are provided in Table 6A below. It can be seen that Dispersion H was stable during the aging period.

TABLE 6A

| Property | Dispersion H initial Properties | After 2 Weeks at 60° C. |
|---|---|---|
| Particle Size (D50) (nm) | 127 | 127 |
| Particle Size (D95) (nm) | 231 | 220 |
| Viscosity (mPa · s) | 4.22 | 3.14 |
| pH | 9.35 | 9.71 |
| Conductivity (mS/cm) | 1.55 | 1.85 |
| Pigment (%) | 12.52% | — |

Inks 7A and 7B were prepared using Dispersion H and other ingredients according to Table 6B.

TABLE 6B

| Ingredients | Ink 7A | Ink 7B |
|---|---|---|
| Dispersion H* | 3.0 | 4.5 |
| 2-Pyrrolidone* | 8.0 | 8.0 |
| 1,2-hexanediol* | 0.5 | 0.5 |
| Glycerol* | 2.0 | 2.0 |
| Glycereth-26* | 6.0 | 6.0 |
| Ethylene glycol* | 2.0 | 2.0 |
| Surfynol 465* | 0.3 | 0.3 |
| Water Added | Balance to 100% | Balance to 100% |

*as % by weight based on total weight of ink

Inks 7A and 7B were printed as described in Example 1. Print properties on various papers are summarized in Table 6C. Inks 7A and 7B both showed high optical density and chroma compared to the comparative Ink 1A made with PR122 as the only colorant (in Example 1). They were also found to have a hue closer to PR122 when compared to the comparative Ink 1B made with PR146 as the only colorant (in Example 1).

TABLE 6C

| Print Properties | Ink 7A | Ink 7B |
|---|---|---|
| Optical Density | | |
| Xerox 4200 | 1.19 | 1.29 |
| HP Multipurpose | 1.36 | 1.37 |
| HP Bright White | 1.35 | 1.45 |
| Chroma (Chroma unit) | | |
| Xerox 4200 | 68 | 68 |
| HP Multipurpose | 71 | 71 |
| HP Bright White | 73 | 73 |
| Hue (degree) | | |
| Xerox 4200 | 359 | 3 |
| HP Multipurpose | 360 | 5 |
| HP Bright White | 359 | 5 |

What is claimed is:

1. A magenta ink-jet ink comprising a vehicle and a pigment colorant dispersed in the vehicle, wherein the pigment colorant comprises a first pigment selected from the group consisting of Pigment Red 184, Pigment Red 269 and combinations thereof, and a second pigment selected from the group consisting of Pigment Red 122, Pigment Violet 23 and combinations thereof.

2. The ink of claim 1, comprising Pigment Red 184 and Pigment Red 122, wherein the weight ratio of Pigment Red 184 to Pigment Red 122 is in the range of about 2:3 to about 5:1.

3. The ink of claim 1, comprising Pigment Red 184 and Pigment Violet 23, wherein the weight ratio of Pigment Red 184 to Pigment Violet 23 is in the range of about 4:1 to about 25:1.

4. The ink of claim 1, comprising Pigment Red 269 and Pigment Red 122, wherein the weight ratio of Pigment Red 269 to Pigment Red 122 is in the range of about 2:3 to about 5:1.

5. The ink of claim 1, wherein the vehicle is an aqueous vehicle.

6. The ink of claim 5, having a surface tension in the range of about 20 mN·m$^{-1}$ to about 50 mN·m$^{-1}$ at 25° C. and a viscosity in the range of about 1 mPa·s to about 20 mPa·s at 25° C.

7. An inkjet ink set comprising:
(a) a magenta ink according to claim 5;
(b) a cyan ink comprising an aqueous vehicle and a cyan pigment colorant dispersed in the aqueous vehicle, wherein the cyan pigment colorant comprises one or more members selected from the group consisting of Pigment Blue 15:3, Pigment Blue 15:4 and combinations thereof; and
(c) a yellow ink comprising an aqueous vehicle and a yellow pigment colorant dispersed in the aqueous vehicle, wherein the yellow pigment colorant comprises Pigment Yellow 74.

8. The ink set of claim 7, wherein the cyan pigment colorant is Pigment Blue 15:3.

9. The ink set of claim 7, wherein the cyan pigment colorant is Pigment Blue 15:4.

10. A process for the production of a magenta inkjet ink comprising the steps of:
(a) combining a first pigment with a second pigment, wherein said first pigment is a member selected from the group consisting of Pigment Red 184, Pigment Red 269 and combinations thereof, and said second pigment is a member selected from the group consisting of Pigment Red 122, Pigment Violet 23 and combinations thereof;
(b) combining a dispersant; and
(c) milling to obtain a dispersion.

* * * * *